United States Patent
Zhang et al.

(10) Patent No.: US 12,254,159 B2
(45) Date of Patent: Mar. 18, 2025

(54) TOUCH STRUCTURE, TOUCH DISPLAY PANEL, AND DISPLAY DEVICE

(71) Applicants: Chengdu BOE Optoelectronics Technology Co., Ltd., Sichuan (CN); BOE Technology Group Co. Ltd., Beijing (CN)

(72) Inventors: Yuanqi Zhang, Beijing (CN); Yi Zhang, Beijing (CN); Yu Wang, Beijing (CN); Shun Zhang, Beijing (CN); Chang Luo, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/563,515

(22) PCT Filed: Jun. 24, 2022

(86) PCT No.: PCT/CN2022/101199
§ 371 (c)(1),
(2) Date: Nov. 22, 2023

(87) PCT Pub. No.: WO2023/142358
PCT Pub. Date: Aug. 3, 2023

(65) Prior Publication Data
US 2024/0256094 A1 Aug. 1, 2024

(30) Foreign Application Priority Data
Jan. 26, 2022 (WO) ................ PCT/CN2022/074113

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04111* (2013.01); *G06F 2203/04112* (2013.01)

(58) Field of Classification Search
CPC ................. G06F 3/0446; G06F 3/0412; G06F 2203/04111; G06F 2203/04112
See application file for complete search history.

(56) References Cited

U.S. PATENT DOCUMENTS

| 8,493,349 B2 | 7/2013 | Hwang et al. |
| 9,459,750 B2 | 10/2016 | Han et al. |

(Continued)

FOREIGN PATENT DOCUMENTS

| CN | 107039397 A | 8/2017 |
| CN | 107799547 A | 3/2018 |

(Continued)

OTHER PUBLICATIONS

Written Opinion from PCT/CN2022/074113 dated Oct. 25, 2022.
(Continued)

*Primary Examiner* — Lixi C Simpson
(74) *Attorney, Agent, or Firm* — Calfee, Halter & Griswold LLP

(57) ABSTRACT

A touch structure, a touch display panel, and a display device are provided, which relate to the field of touch technology. The touch structure includes first touch electrodes and second touch electrodes. The first touch electrode includes first electrode blocks and transfer bridges. The second touch electrode includes second electrode blocks. The first and second touch electrodes are mesh structures. Grid lines of the first and second electrode blocks are channel lines, and the channel lines forming boundaries of the first electrode block are first boundary channel lines. Grid lines of the transfer bridge are transfer lines. The transfer bridge (Continued)

includes an opening part and a bridge part connected to the opening part. The opening part is connected to the first electrode block through a via hole. Some transfer lines are boundary transfer lines. The boundary transfer lines are overlapped with some first boundary channel lines.

20 Claims, 6 Drawing Sheets

(56) References Cited

U.S. PATENT DOCUMENTS

| | | |
|---|---|---|
| 9,519,174 B2 | 12/2016 | Kim et al. |
| 9,606,687 B2 | 3/2017 | Pang et al. |
| 10,095,362 B2 | 10/2018 | Hirakata et al. |
| 10,866,664 B2 | 12/2020 | Miyamoto et al. |
| 10,892,305 B2 | 1/2021 | Feng |
| 10,963,082 B2 | 3/2021 | Lin et al. |
| 11,003,298 B2 | 5/2021 | Li et al. |
| 11,023,058 B2 | 6/2021 | Park et al. |
| 11,385,752 B2 | 7/2022 | Li et al. |
| 11,782,542 B2 | 10/2023 | Amid et al. |
| 12,123,753 B2 | 10/2024 | Shen et al. |
| 2011/0141037 A1 | 6/2011 | Hwang et al. |
| 2014/0111709 A1 | 4/2014 | Kim et al. |
| 2015/0234425 A1 | 8/2015 | Kim et al. |
| 2015/0261370 A1 | 9/2015 | Yoo et al. |
| 2015/0277627 A1 | 10/2015 | Pang et al. |
| 2015/0346866 A1 | 12/2015 | Kusunoki et al. |
| 2016/0070406 A1 | 3/2016 | Han et al. |
| 2016/0282989 A1 | 9/2016 | Hirakata et al. |
| 2017/0147116 A1 | 5/2017 | Lee et al. |
| 2018/0120998 A1 | 5/2018 | Jeong |
| 2018/0143720 A1 | 5/2018 | Kim et al. |
| 2018/0190723 A1 | 7/2018 | Han et al. |
| 2018/0329549 A1* | 11/2018 | Miyamoto ............ G06F 3/0446 |
| 2019/0050078 A1 | 2/2019 | Hamada et al. |
| 2019/0294284 A1 | 9/2019 | Akimoto et al. |
| 2019/0319052 A1 | 10/2019 | Yoshida |
| 2019/0361546 A1 | 11/2019 | Pang et al. |
| 2019/0369784 A1 | 12/2019 | Yao et al. |
| 2020/0183538 A1 | 6/2020 | Li et al. |
| 2020/0303467 A1 | 9/2020 | Feng |
| 2021/0026483 A1 | 1/2021 | Miyamoto et al. |
| 2021/0200379 A1* | 7/2021 | Youk ..................... G06F 3/0443 |
| 2021/0208739 A1 | 7/2021 | Li et al. |
| 2021/0357080 A1 | 11/2021 | Lee et al. |
| 2021/0373691 A1 | 12/2021 | Li et al. |
| 2022/0155902 A1* | 5/2022 | Chuang .............. G06F 3/04164 |
| 2023/0043343 A1* | 2/2023 | Cho ...................... G06F 3/0416 |
| 2024/0045533 A1 | 2/2024 | Miyamoto et al. |
| 2024/0256094 A1 | 8/2024 | Zhang et al. |
| 2024/0264704 A1 | 8/2024 | Zeng et al. |
| 2024/0288975 A1 | 8/2024 | Zhang et al. |

FOREIGN PATENT DOCUMENTS

| | | |
|---|---|---|
| CN | 207780739 U | 8/2018 |
| CN | 108693994 A | 10/2018 |
| CN | 108762571 A | 11/2018 |
| CN | 109545085 A | 3/2019 |
| CN | 110391253 A | 10/2019 |
| CN | 110764636 A | 2/2020 |
| CN | 111665986 A | 9/2020 |
| CN | 112313610 A | 2/2021 |
| CN | 109545085 B | 6/2021 |
| CN | 113296637 A | 8/2021 |
| CN | 113366419 A | 9/2021 |
| CN | 113518966 A | 10/2021 |
| CN | 113692567 A | 11/2021 |
| EP | 3828674 A1 | 6/2021 |
| JP | 2019184945 A | 10/2019 |
| TW | M567905 U | 10/2018 |
| WO | 2015111871 A1 | 7/2015 |
| WO | 2019104985 A1 | 6/2019 |
| WO | 2021159299 A1 | 8/2021 |

OTHER PUBLICATIONS

Written Opinion from PCT/CN2022/101199 dated Oct. 10, 2022.
International Search Report from PCT/CN2022/101199 dated Oct. 10, 2022.
International Search Report from from PCT/CN2022/074113 dated Oct. 25, 2022.
Notice of Allowance of U.S. Appl. No. 18/262,197 dated Nov. 1, 2024.

* cited by examiner ciples of the present disclosure. Apparently, the drawings in the following description are only some embodiments of the present disclosure. For those of ordinary skills in the art, other drawings can also be obtained based on these drawings without creative work.

TOUCH STRUCTURE, TOUCH DISPLAY PANEL, AND DISPLAY DEVICE

CROSS REFERENCE TO RELATED APPLICATION(S)

The present disclosure is a 35 U.S.C. 371 national phase application of PCT International Application No. PCT/CN2022/101199 filed on Jun. 24, 2022, which claims priority to the PCT application titled "Touch Structure, Touch Display Panel, and Display Device" with the application number PCT/CN2022/074113 filed on Jan. 26, 2022, the entire contents of both are incorporated herein by reference in their entireties.

TECHNICAL FIELD

The present disclosure relates to the field of touch technology, and specifically to a touch structure, a touch display panel, and a display device.

BACKGROUND

Touch display panels have been widely used in terminal devices such as mobile phones and tablet computers. While displaying images, human-computer interactions can be realized through touch operations. The touch position is determined based on changes in the sensed capacitance for achieving the touch operation. However, currently some touch display panels are prone to abnormal phenomena such as touch failures and errors.

It should be noted that the information disclosed in the above background section is only used to enhance understanding of the background of the present disclosure, and therefore may include information that does not constitute prior art known to those of ordinary skills in the art.

SUMMARY

The present disclosure provides a touch structure, a touch display panel, and a display device.

According to an aspect of the present disclosure, a touch structure is provided. The touch structure is provided on a side of a display substrate. The touch structure includes a plurality of first touch electrodes and a plurality of second touch electrodes. The first touch electrodes are arranged at intervals along a row direction. One of the first touch electrodes includes a plurality of first electrode blocks arranged at intervals along a column direction and transfer bridges connecting two adjacent first electrode blocks. The second touch electrodes are arranged at intervals along the column direction. One of the second touch electrodes includes a plurality of second electrode blocks connected in series along the row direction. One of the transfer bridges is intersected with one of the second touch electrodes. The first electrode block and the second electrode block are located on the same electrode layer and arranged at intervals. The transfer bridge is located on a side of the electrode layer, and an insulation layer is provided between the electrode layer and the transfer bridge.

The first touch electrode and the second touch electrode are mesh structures formed by a plurality of grid lines. The grid lines of the first electrode block and the second electrode block are channel lines, and the channel lines forming boundaries of the first electrode block are first boundary channel lines. The grid lines of the transfer bridge are transfer lines. The transfer bridge includes at least two opening parts and a bridge part connecting the two opening parts. The opening part and the first electrode block are connected through a via hole penetrating the insulation layer, and the bridge part is intersected with the second touch electrode. Some transfer lines of the opening part are boundary transfer lines. The boundary transfer lines overlap with some of the first boundary channel lines. The transfer line and the channel line overlapping with each other extend in the same direction.

Among the boundary transfer line and the first boundary channel line overlapping with each other, one side of the boundary transfer line is located on the side of the first boundary channel line close to the adjacent second electrode block, and the other side of the boundary transfer line is located between both sides of the first boundary channel line.

In an exemplary embodiment of the present disclosure, at least some adjacent transfer lines in the opening part are connected through a transfer intersection part, and at least some of the transfer intersection parts are connected to the boundary transfer line. At least some adjacent channel lines in the first electrode block are connected through a channel intersection part, and at least some of the channel intersection parts are connected to the boundary channel line.

The transfer intersection parts and the channel intersection parts overlap in a one-to-one correspondence, and the transfer intersection part and the channel intersection part overlapping with each other are connected through the via holes.

Among the transfer intersection part and the channel intersection part overlapping with each other, the boundary of the transfer intersection part is located inside the boundary of the channel intersection part.

In an exemplary embodiment of the present disclosure, the mesh structure has mesh holes surrounded by the mesh lines.

The transfer lines of the opening part surround a mesh hole, and two adjacent transfer lines are connected by a transfer intersection part. The two transfer lines of the opening part are the boundary transfer lines, and the bridge part is only connected to a transfer intersection part connecting the two boundary transfer lines.

In an exemplary embodiment of the present disclosure, the mesh structure has mesh holes surrounded by the mesh lines.

The transfer lines of the opening part surround a mesh hole, and two adjacent transfer lines are connected through a transfer intersection part. There is only one transfer line serving as the boundary transfer line in the opening part. The bridge part is connected to the transfer intersection part connected with both ends of the boundary transfer line.

In an exemplary embodiment of the present disclosure, the opening part has four transfer lines and four transfer intersection parts. The mesh holes surrounded by the four transfer lines and the four transfer intersection parts are in quadrangular shapes, and the four transfer intersection parts are provided with the via holes.

In an exemplary embodiment of the present disclosure, among the boundary transfer line and the first boundary channel line overlapping with each other, the distance between one side of the boundary transfer line close to the adjacent second electrode block and the side of the first boundary channel line close to the adjacent second electrode block is a first distance, and the distance between the other side of the boundary transfer line and the side of the first boundary channel line away from the adjacent second electrode block is a second distance.

The first distance is equal to the second distance.

In an exemplary embodiment of the present disclosure, among the transfer line not serving as the boundary transfer line in the opening part and the channel line overlapping with the transfer line, one side of the boundary of the transfer line is located at the side of the channel line away from the adjacent second electrode block, and the other side of the transfer line is located between both sides of the channel line.

In an exemplary embodiment of the present disclosure, among the transfer line not serving as the boundary transfer line in the opening part and the channel line overlapping with the transfer line, the distance between one side of the boundary of the transfer line and the side of the channel line away from the second electrode block is a third distance, and the distance between the other side of the transfer line and the side of the channel line close to the adjacent second electrode block is a third distance.

The third distance is equal to the fourth distance.

In an exemplary embodiment of the present disclosure, the first distance, the second distance, the third distance, and the fourth distance are equal.

In an exemplary embodiment of the present disclosure, at least one of the first distance and the third distance is 1.2 μm.

In an exemplary embodiment of the present disclosure, among the opening part and the first electrode block connected with each other, the transfer lines of the opening part are the boundary transfer lines, and at least two adjacent boundary transfer lines are connected through a transfer intersection part.

In an exemplary embodiment of the present disclosure, the opening part has four transfer lines, and the opening part has four transfer intersection parts. The four transfer lines extend along the trajectory of the first boundary channel line. The four transfer intersection parts are provided with the via holes.

In an exemplary embodiment of the present disclosure, among the opening part and the first electrode block connected with each other, in the first boundary channel lines of the first electrode block, the first boundary channel lines located on both sides of the opening part and adjacent to the opening part are disconnected from the opening part.

In an exemplary embodiment of the present disclosure, the channel line forming the boundary of the second electrode block is the second boundary channel line.

Among the second touch electrode and the bridge part intersected with the second touch electrode, the second boundary channel lines located on both sides of the bridge part and adjacent to the bridge part are disconnected from the bridge part.

In an exemplary embodiment of the present disclosure, some transfer lines of the bridge part overlap with the second boundary channel lines in a one-to-one correspondence.

Among the transfer line and the second boundary channel line overlapping with each other, one side of the transfer line is located on a side of the second boundary channel line close to the adjacent first electrode block, and the other side of the transfer line is located between both sides of the second boundary channel line.

In an exemplary embodiment of the present disclosure, among the transfer line and the second boundary channel line overlapping with each other, the distance between one side of the boundary of the transfer line and the side of the second boundary channel line close to the first electrode block is the fifth distance, and the distance between the other side of the transfer line and the side of the second boundary channel line away from the adjacent first electrode block is the sixth distance.

The fifth distance is equal to the sixth distance.

In an exemplary embodiment of the present disclosure, at least one end of the bridge part is connected to at least two opening parts, and the opening parts connected to one end of the bridge part are connected to the first electrode therethrough.

According to an aspect of the present disclosure, a touch display panel is provided, including: a display substrate; and the touch structure described in any of the above embodiments.

The transfer bridges are provided on one side of the display substrate, the insulation layer covers the transfer bridges, and the electrode layer is provided on the side of the insulation layer away from the display substrate.

According to an aspect of the present disclosure, a display device is provided, including the touch display panel described in any one of the above embodiments.

It should be understood that the foregoing general description and the following detailed description are exemplary and explanatory only, and do not limit the present disclosure.

BRIEF DESCRIPTION OF THE DRAWINGS

The accompanying drawings, which are incorporated in and constitute a part of this specification, illustrate embodiments consistent with the present disclosure and together with the description, serve to explain the principles of the present disclosure. It is noted that the drawings in the following description are only some embodiments of the present disclosure. For those of ordinary skill in the art, other drawings may be obtained based on these drawings without exerting creative efforts.

DETAILED DESCRIPTION OF THE EMBODIMENTS

Figure 1:
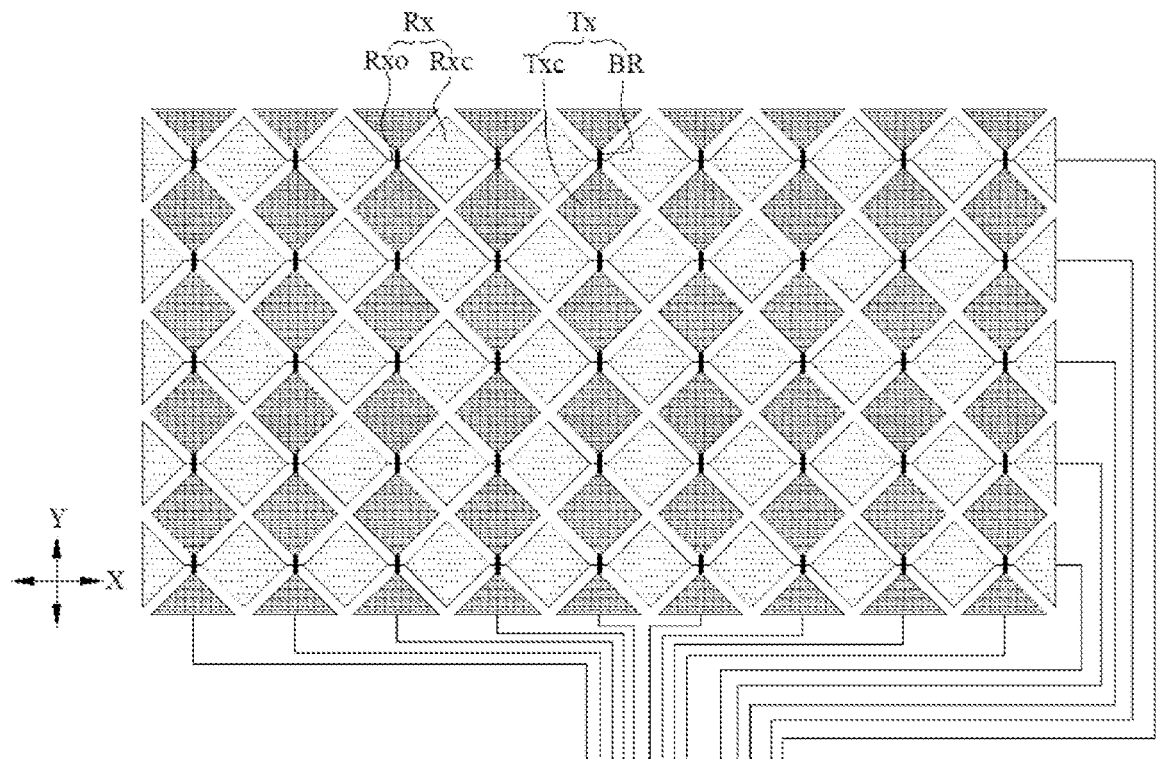
FIG. 1 is a top view of the touch structure according to an embodiment of the present disclosure.

Example embodiments will now be described more fully with reference to the accompanying drawings. Example embodiments may, however, be embodied in various forms and should not be construed as limited to the embodiments set forth herein. Rather, these embodiments are provided so that the present disclosure will be thorough and complete and will fully convey the concepts of the example embodiments to those skilled in the art. The same reference numerals in the drawings indicate the same or similar structures, and thus their detailed descriptions will be omitted. Furthermore, the drawings are merely schematic illustrations of the present disclosure and are not necessarily drawn to scale.

The terms "a", "an", "the", "said", and "at least one" are used to indicate the presence of one or more elements/components/etc. The terms "include" and "have" are used to indicate an open-ended inclusive and mean that there may be additional elements/components/etc. in addition to those listed. The terms "first", "second", "third" etc. are only used as markers, not a limit on the number of the associated objects.

In the specification, the row direction X and the column direction Y are merely two intersecting directions, which may be perpendicular to each other or form an included angle therebetween, such as from 80 degrees to 110 degrees. In the drawings of the present disclosure, the row direction X is transverse, and the column direction Y is vertical, but the present disclosure is not limited in this regard. For example, if the touch structure is rotated, actual orientations of the row direction X and the column direction Y may be changed. In the drawings, the direction X is shown schematically as the row direction, and the direction Y is shown schematically as the column direction. At the same time, the expression of A and B being "adjacent" as described in the specification means that there is no other A or B existing between A and B. For example, the expression of a first electrode block and a second electrode block being adjacent indicates that there is no other first electrode block and second electrode block existing between the first electrode block and the second electrode block.

Embodiments of the present disclosure provide a touch structure, which is provided on one side of a display substrate. The display substrate is used to display images. The display substrate may be an organic electroluminescent display substrate, a liquid crystal display substrate, or other device capable of displaying images. The device is not specifically limited here. The touch structure may be used to sense touch operations, determine the touch position, and display corresponding images on the display substrate.

Figure 2:
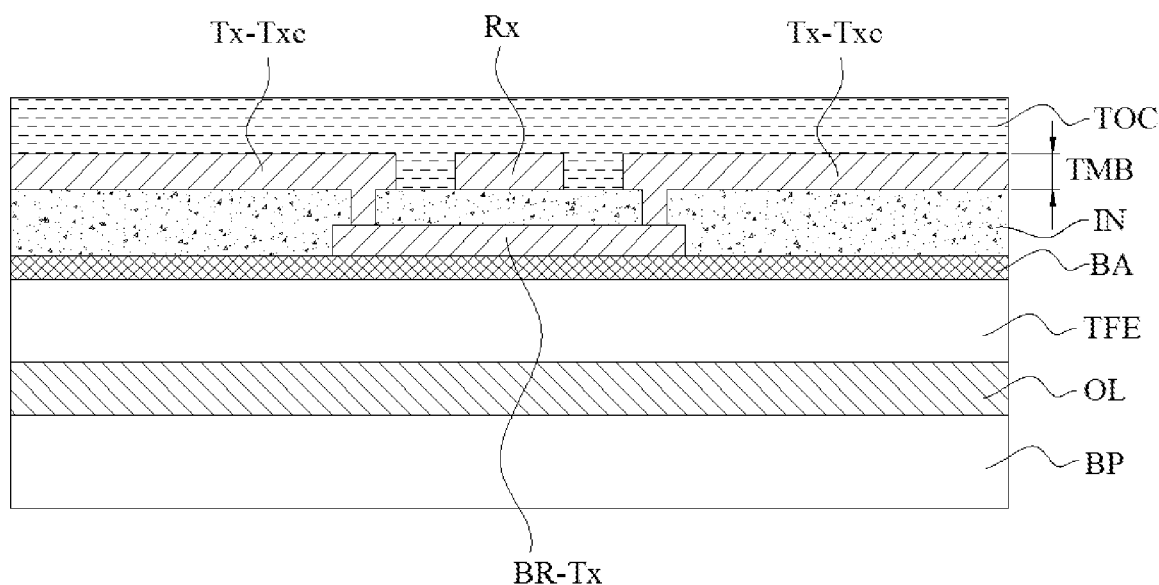
FIG. 2 is a partial cross-sectional view of the touch display panel according to an embodiment of the present disclosure.

As shown in FIGS. 1 and 2, the touch structure of the present disclosure is a mutual capacitance structure, which may include a plurality of first touch electrodes Tx and a plurality of second touch electrodes Rx. The first touch electrodes Tx may be arranged at intervals along the row direction X. The second touch electrodes Rx may be arranged at intervals along the column direction Y. Each of the first touch electrode Tx and the second touch electrode Rx may include a plurality of electrode blocks connected in series. Any of the first touch electrodes Tx may include a plurality of first electrode blocks Txc connected in series along the column direction Y, and two adjacent first electrode blocks Txc in the column direction Y are connected in series through a transfer bridge BR. Any of the second touch electrodes Rx may include a plurality of second electrode blocks Rxc connected in series along the row direction X, and two adjacent second electrode blocks Rxc may be connected in series through a connection part Rxo.

The first electrode blocks Txc and the second electrode blocks Rxc are arranged in an array, and at least some of the first electrode blocks Txc are arranged adjacent to different second electrode blocks Rxc in two different directions intersecting with the row direction X and the column direction Y. Accordingly, at least some of the second electrode blocks Rxc are arranged adjacent to different first electrode blocks Txc in two different directions intersecting with the row direction X and the column direction Y.

There is a gap between a first electrode block Txc and a second electrode block Rxc adjacent to each other, thereby forming a capacitance. In order to increase the facing area between a first electrode block Txc and a second electrode block Rxc adjacent to each other, edges of the first electrode block Txc and the second electrode block Rxc may have interdigitated fingers FI arranged at intervals along the circumferential direction. In a first electrode block Txc and a second electrode block Rxc adjacent to each other, some of the interdigitated fingers FI of the first electrode block Txc may be located between some of the interdigitated fingers FI of the second electrode block Rxc, but do not contact each other. Thus, these interdigitated fingers FI of the first electrode block Txc and these interdigitated fingers FI of the second electrode block Rxc are alternately arranged at intervals. The interdigitated fingers FI render the extension trajectory of the gap between the first electrode block Txc and the second electrode block Rxc to be more tortuous. In this way, the facing area between the first electrode block Txc and the second electrode block Rxc can be increased without increasing the area of each of the two. This is beneficial to increasing the capacitance between the two and improving the sensitivity of the inductive touch operation.

A capacitance may be formed between any adjacent first electrode block Txc and second electrode block Rxc. When a finger performs a touch operation, the capacitance at the touch position may change. Based on the first electrode block Txc and the second electrode block Rxc corresponding to the change amount of the sensing capacitance, the touch position may be determined, and the detailed principle will not be described in detail here.

As shown in FIG. 1, each first touch electrode Tx may be connected to a different signal terminal through a different lead, and each second touch electrode Rx may also be connected to a different signal terminal through a different lead, so that signals may be sent and received through the first touch electrode Tx and the second touch electrode Rx. For example, the first touch electrode Tx may be used as a driving electrode for receiving a driving signal, and the second touch electrode Rx may be used as a sensing electrode for outputting a sensing signal. It is noted that the functions of the first touch electrode Tx and the second touch electrode Rx are interchangeable.

As shown in FIGS. 1 and 2, the above-mentioned electrode blocks and the connection part Rxo may be located on the same electrode layer TMB. The electrode layer TMB may be formed simultaneously through a patterning process. That is to say, the electrode layer TMB includes the electrode block of the first touch electrode Tx and the second touch electrode Rx. In order to prevent the first touch electrode Tx and the second touch electrode Rx from being short-circuited, the transfer bridge BR may be provided on one side of the electrode layer TMB. That is, the transfer bridge BR and the electrode layer TMB are in different layers. At the same time, an insulation layer IN is provided between the transfer bridge BR and the electrode layer TMB, thereby being separated. The first touch electrode Tx may be intersected with the second touch electrode Rx at the transfer bridge BR. Further, the transfer bridge BR may be intersected with the connection part Rxo. In addition, the transfer bridge BR may be connected to the first electrode block Txc through the via hole Ho penetrating the insulation layer IN.

As shown in FIGS. 1-2, in some embodiments of the present disclosure, the transfer bridge BRs may be provided on the light exit side of the display substrate PNL, and may be formed at the same time. Each transfer bridge BR has the same thickness and the same material, so that they can be formed simultaneously. The insulation layer IN may cover each transfer bridge BR and bulge at a position corresponding to the transfer bridge BR, but is not disconnected. That is to say, the insulation layer IN may rise and fall with the existence of the transfer bridge BR. The electrode layer TMB may be disposed on the surface of the insulation layer IN away from the display substrate PNL. Each transfer bridge BR may be connected to the same first electrode block Txc through one or more via holes Ho penetrating the insulation layer IN.

Figure 3:
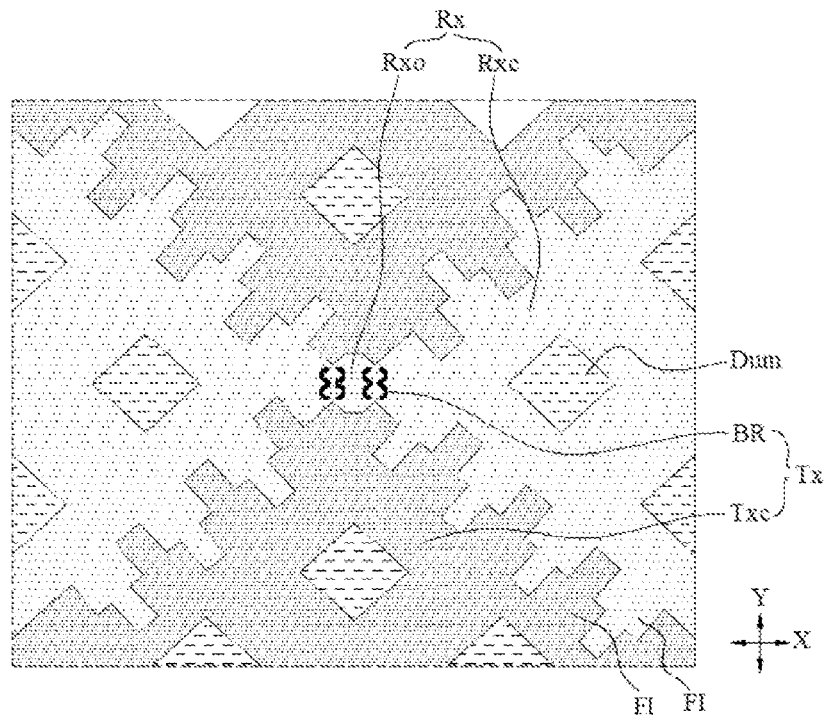
FIG. 3 is a partial cross-sectional view of the touch structure according to an embodiment of the present disclosure.
Figure 4:
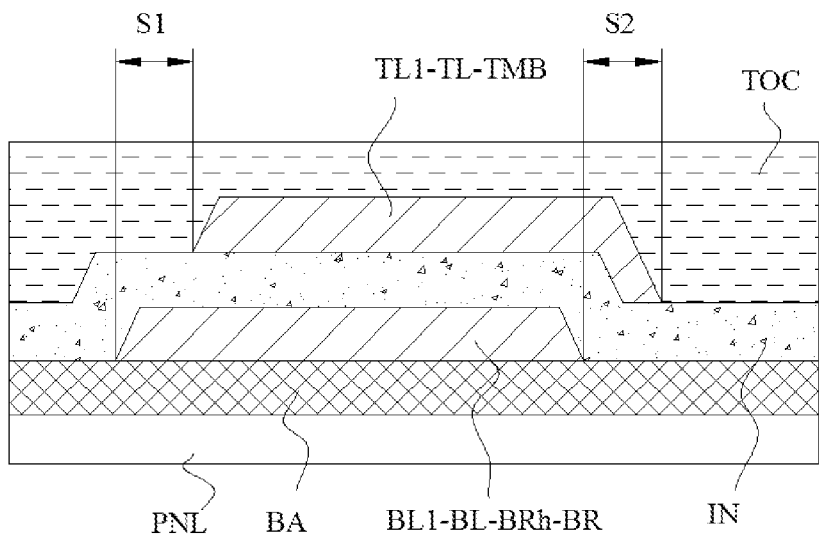
FIG. 4 is a partial enlarged view of the touch structure according to an embodiment of the present disclosure.

As shown in FIGS. 1 and 3, in the same first touch electrode Tx, the number of transfer bridges BR connecting two adjacent first electrode blocks Txc may be one or more. If there are multiple transfer bridges BR, then the multiple transfer bridges BR may be arranged side by side along the row direction X, and are intersected with the same connection part Rxo in space. That is, the orthographic projections of the two on the display substrate PNL intersect with each other, but are not actually connected, thereby preventing the first touch electrode Tx and the second touch electrode Rx being connected to cause a short circuit.

As shown in FIG. 3, in some embodiments of the present disclosure, both the first electrode block Txc and the second electrode block Rxc may be embedded in the dummy electrode Dum. For example, the first electrode block Txc and the second electrode block Rxc have hollow areas, which are via-hole structures penetrating the electrode layer. The dummy electrode Dum is located in the hollow area, and is arranged on the same layer as the first electrode block Txc and the second electrode block Rxc. There may be one or more dummy electrodes Dum in the hollow area, and each dummy electrode Dum is in a floating state. That is, it is not electrically connected to any other structure, and does not receive any electrical signals.

Both the transfer bridge BR and the electrode layer TMB may be single-layer or multi-layer conductive structures. For example, the transfer bridge BR may include two outer layers and an intermediate layer located between the two outer layers. The material of the outer layer may be titanium, and the material of the intermediate layer may be aluminum. That is, the transfer bridge BR has a Ti/Al/Ti structure. Alternatively, the material of the outer layer may be indium tin oxide (ITO), and the material of the intermediate layer may be aluminum. That is, the transfer bridge BR is an ITO/Ag/ITO structure. At the same time, if the electrode layer TMB has a multi-layer structure, it may also be a Ti/Al/Ti structure or an ITO/Ag/ITO structure.

The material of the insulation layer IN may be silicon nitride. It is noted that the material of the insulation layer IN may also be other inorganic insulation materials or organic insulation materials such as silicon oxide, silicon nitride oxide, etc.

In addition, as shown in FIG. 2, in some embodiments of the present disclosure, the touch structure may also include a buffer layer BA and a protective layer TOC. The buffer layer BA may serve as the base of the touch structure, which may be provided on the light exit side of the display substrate PNL, and may be made of insulation materials such as silicon nitride and silicon oxide. The transfer bridge BR may be located on the surface of the buffer layer BA away from the display substrate PNL. The protective layer TOC may cover the electrode layer TMB and an area of the insulation layer IN that is not covered by the electrode layer TMB. The protective layer TOC is used to protect the electrode layer TMB, and the material thereof may be a transparent insulation material such as polyimide (PI) or optical glue.

As shown in FIGS. 1 and 5-11, in order to reduce the obstruction of the light emitted by the display substrate PNL, the first touch electrode Tx and the second touch electrode Rx may each have a mesh structure formed by multiple grid lines. Each grid line may extend along a straight line, but in different directions. The grid lines of the first electrode block Txc and the second touch electrode Rx may be defined as the channel lines TL, and the grid lines of the transfer bridge BR may be defined as the transfer lines BL. The aforementioned mesh structure has multiple mesh holes NEh, and each mesh hole NEh is surrounded by multiple grid lines. For example, any mesh hole NEh of the electrode layer TMB may be surrounded by multiple channel lines TL. Any mesh hole NEh of the transfer bridge BR may be surrounded by multiple transfer lines BL. The mesh hole NEh may be in the shape of a polygon, for example, a rhombus or a hexagon. There is no special limitation here. Each side of the polygon is a grid line. In addition, the dummy electrode Dum may also have a mesh structure, and may be formed simultaneously with the first electrode block Txc and the second touch electrode Rx.

It should be noted that due to the width of the grid line, the shape of the aforementioned polygon is not limited to a polygon in a standard geometric figure. The vertices of a polygon are not points in the geometric sense, but refer to the area where the grid lines intersect.

As shown in FIGS. 5 to 11, the electrode layer TMB is disconnected at some of the channel lines TL, thereby obtaining the first electrode block Txc and the second touch electrode Rx by division. That is to say, the gap between the adjacent first electrode block Txc and second touch electrode Rx may be formed by disconnection of the channel line TL. The disconnected of the channel line TL may be to remove a local area of the channel line TL or to remove the entire channel line TL. The dotted line S in FIGS. 5 to 11 shows the extension path of the gap between the first electrode block Txc and the second touch electrode Rx. The extension path is only a schematic illustration and does not limit the actual extension path.

The gap between the first electrode block Txc and the second touch electrode Rx adjacent to the first electrode block Txc may be formed by the above-mentioned disconnection. The boundary between the first electrode block Txc and the second touch electrode Rx may be formed by some of the channel lines TL. That is, the outermost channel line TL of the first electrode block Txc and the second touch electrode Rx forms its boundary. The boundary of the second touch electrode Rx includes the boundary of the second electrode block Rxc and the boundary of the connection part Rxo.

Among the transfer bridge BR and the first electrode block Txc connected thereto and the second touch electrode Rx intersected therewith, the transfer bridge BR crosses over the second touch electrode Rx and the gap between the first electrode block Txc and the second touch electrode Rx, thereby being connected to the first electrode block Txc. The width of the gap crosses over by the transfer bridge BR may be equal to the length of a transfer line BL, and the transfer bridge BR has a plurality of transfer lines BL opposite to the gap. That is, the orthographic projections of some of the transfer lines BL of the transfer bridge BR on the display substrate PNL are located within the gap of the orthographic projection of the gap between the first electrode block Txc and the second touch electrode Rx on the display substrate PNL, so that the transfer bridge BR can cross over the second touch electrode Rx in space, thereby being connected to the first electrode block Txc.

As shown in FIGS. 5 to 11, a transfer bridge BR may include at least two opening parts BRh and a bridge part BRb connecting the two opening parts BRh. The at least two opening parts BRh are respectively connected to the two first electrode blocks Txc connected with the transfer bridge BR. The opening part BRh and the first electrode block Txc may be connected through the via hole Ho. The bridge part BRb is intersected with the second touch electrode Rx, but remains insulated. For example, the bridge part BRb may be intersected with the connection part Rxo.

In some embodiments of the present disclosure, for a transfer bridge BR, the number of the opening parts BRh is two, and they are connected to both ends of the bridge part BRb. The two opening parts BRh are respectively connected to the two first electrodes Txc connected with the transfer bridge BR.

In other embodiments of the present disclosure, for a transfer bridge BR, the number of opening parts BRh is greater than two, and at least one end of the bridge part BRb may be connected to two or more opening parts BRh. Therefore, one transfer bridge BR may be connected to a first electrode Txc through a plurality of opening parts BRh.

For convenience of description, the channel line TL forming the boundary of the first electrode block Txc may be defined as the first boundary channel line TL1, and the channel line TL forming the boundary of the second electrode block Rxc may be defined as the second boundary channel line TL2. At the same time, some of the transfer lines BL of the opening part BRh are defined as the boundary transfer lines BL1.

For the opening part BRh and the first electrode block Txc connected with each other, the boundary transfer line BL1 may overlap with some of the first boundary channel lines TL1 in a one-to-one correspondence, and the transfer line BL and the channel line TL overlapping with each other may have the same extension direction.

As shown in FIGS. 5 to 11, in some embodiments of the present disclosure, the area where the channel lines TL of the first electrode block Txc intersect is the channel intersection area, and the area where different transfer lines BL of the transfer bridge BR intersect is the transfer intersection area. The boundary of the first electrode block Txc has a plurality of channel intersection areas, and the channel intersection areas of the boundary of the first electrode block Txc overlap with at least some of the transfer intersection areas in a one-to-one correspondence.

The transfer intersection area of the opening part BRh may be defined as the transfer intersection part BRc, and the adjacent transfer lines BL of the opening part BRh may be connected through the transfer intersection part BRc. At the same time, the channel intersection area overlapping with the transfer intersection part BRc may be defined as the channel intersection part TLc, and the adjacent channel lines TL of the channel intersection part TLc may be connected through the channel intersection part TLc. The transfer intersection part BRc and the channel intersection part TLc overlapping with each other are connected through the via hole Ho.

The channel intersection part TLc may be an integral structure with the channel line TL, which may be a sheet structure in a polygonal or circular shape. The width of the channel intersection part TLc in a direction perpendicular to the channel line TL connected with the channel intersection part TLc may be larger than the width of the channel line TL. At the same time, the transfer intersection part BRc may be an integral structure with the transfer line BL, which may be a sheet structure in a polygonal or circular shape. The width of the transfer intersection part BRc in a direction perpendicular to the transfer line BL connected with the transfer intersection part BRc may be larger than the width of the transfer line BL, thereby providing more space for the via hole Ho and preventing the via hole Ho from cutting off the grid lines.

The following is an exemplary explanation of the arrangement of mesh holes NEh based on the basic structure of the display substrate PNL.

As shown in FIGS. 5 to 11 and 12, the display substrate PNL may have multiple light-emitting units. Each light-emitting unit may include multiple independently emitting sub-pixels SP. The same light-emitting unit may include at least multiple sub-pixels SP with different emitting colors. Each of the above-mentioned mesh holes NEh may be arranged corresponding to the sub-pixels SP of the display substrate PNL. There is at least one sub-pixel SP within the orthographic projection of a mesh hole NEh on the display substrate PNL. The light emitted by the sub-pixel SP may be emitted from the mesh hole NEh. The obstruction by the touch structure of the light emitted by the display substrate PNL is reduced. For example, the display substrate PNL may be an organic electroluminescent display substrate, that is, an OLED display substrate, which may include a driving backplane BP and a light-emitting device layer OL located on one side of the driving backplane BP. The light-emitting device layer OL may include a plurality of light-emitting devices arranged in an array. The light-emitting devices may be organic light-emitting diodes. In some embodiments, each light-emitting device emits light independently, and the colors may be different. In this case, one light-emitting device may be used as a sub-pixel SP. In other embodiments, the light-emitting devices emit the same color. At this time, the display substrate PNL may also include a color filter layer, which may include filter parts corresponding to the light-emitting devices in a one-to-one correspondence. The filter part may only emit monochromatic light. The filter part and the corresponding light-emitting device may be used as a sub-pixel SP.

It should be noted that the above-mentioned light-emitting units are only delineated to facilitate the description about the arrangement of the sub-pixels SP, and are not limited to the basic units for displaying images. When displaying an image, each sub-pixel SP may be divided into multiple pixels, and each pixel includes at least three colors of sub-pixels SP. Adjacent pixels may share some of the sub-pixels SP. That is to say, a sub-pixel SP in a light-emitting unit may be shared by two different pixels, and image display is achieved through the sub-pixel rendering (SPR) algorithm. It is noted that different pixels do not need to share the sub-pixel SP. In this case, the light-emitting unit may be used as a pixel.

Figure 12:
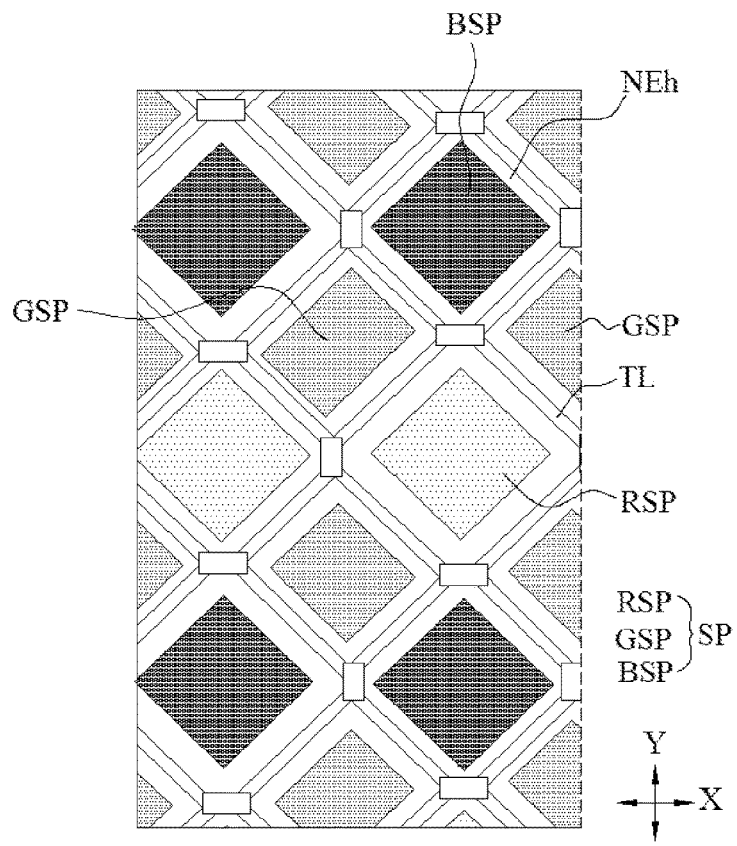
FIG. 12 is a partial schematic diagram of sub-pixels and mesh holes of a touch display panel according to an embodiment of the present disclosure.

As shown in FIGS. 5-8, in some embodiments of the present disclosure, the display substrate PNL is an organic electroluminescent display substrate PNL. Specifically, as shown in FIG. 12, the same light-emitting unit may include four sub-pixels SP, that is, one red sub-pixel GSP, one blue sub-pixel BSP, and two green sub-pixels GSP. The red sub-pixel RSP and the blue B sub-pixel SP may be arranged along the column direction Y, and the blue sub-pixel BSP is larger than the red sub-pixel RSP. The two green sub-pixels GSP are arranged on both sides of the red sub-pixel RSP and the blue sub-pixel BSP along the row direction X, and the areas of the two green sub-pixels GSP are the same. The lines connecting centers of the four sub-pixels form a shape of quadrilateral, for example, rectangle, rhombus, trapezoid, etc. The outline of each sub-pixel SP may also be in a shape of quadrilateral, such as rectangle, rhombus, trapezoid, etc. But the area of the green sub-pixel GSP is smaller than that of the red sub-pixel RSP.

Accordingly, the mesh hole NEh of the touch structure may be in a polygonal shape, such as rectangle, rhombus, trapezoid, etc., and each sub-pixel SP corresponds to only one mesh hole NEh, so that light can be emitted through the mesh hole NEh. The shape of any sub-pixel SP is the same as the shape of the corresponding mesh hole NEh. If both of them are polygons, then sides of the sub-pixel SP and sides of the mesh hole NEh (that is, the grid lines surrounding the mesh hole NEh) are parallel in a one-to-one correspondence. The mesh hole NEh corresponding to the green sub-pixel SP is smaller than the mesh hole NEh corresponding to the red sub-pixel SP, and the mesh hole NEh corresponding to the blue sub-pixel SP is larger than the mesh hole NEh corresponding to the red sub-pixel SP. It is noted that the shape and size of each mesh hole NEh may be the same, as long as it is larger than the corresponding sub-pixel SP and also avoid blocking the sub-pixel SP.

Among an opening part BRh and the first electrode block Txc connected thereto, the number of via holes Ho connecting the opening part BRh and the first electrode block Txc may be the same as the number of vertices of a mesh hole NEh, and each via hole Ho is located in a one-to-one correspondence at the channel intersection part TLc and the transfer intersection part BRc at each vertex, where some of the via holes Ho may be located on the boundary of the first electrode block Txc. For example, one or two via holes Ho may be located on the boundary of the first electrode block Txc, while other via holes Ho are not located on the boundary of the first electrode block Txc. At this time, only some of the transfer lines BL of the opening part BRh are the boundary transfer line BL1, and extend along the boundary of the first electrode block Txc.

Figure 9:
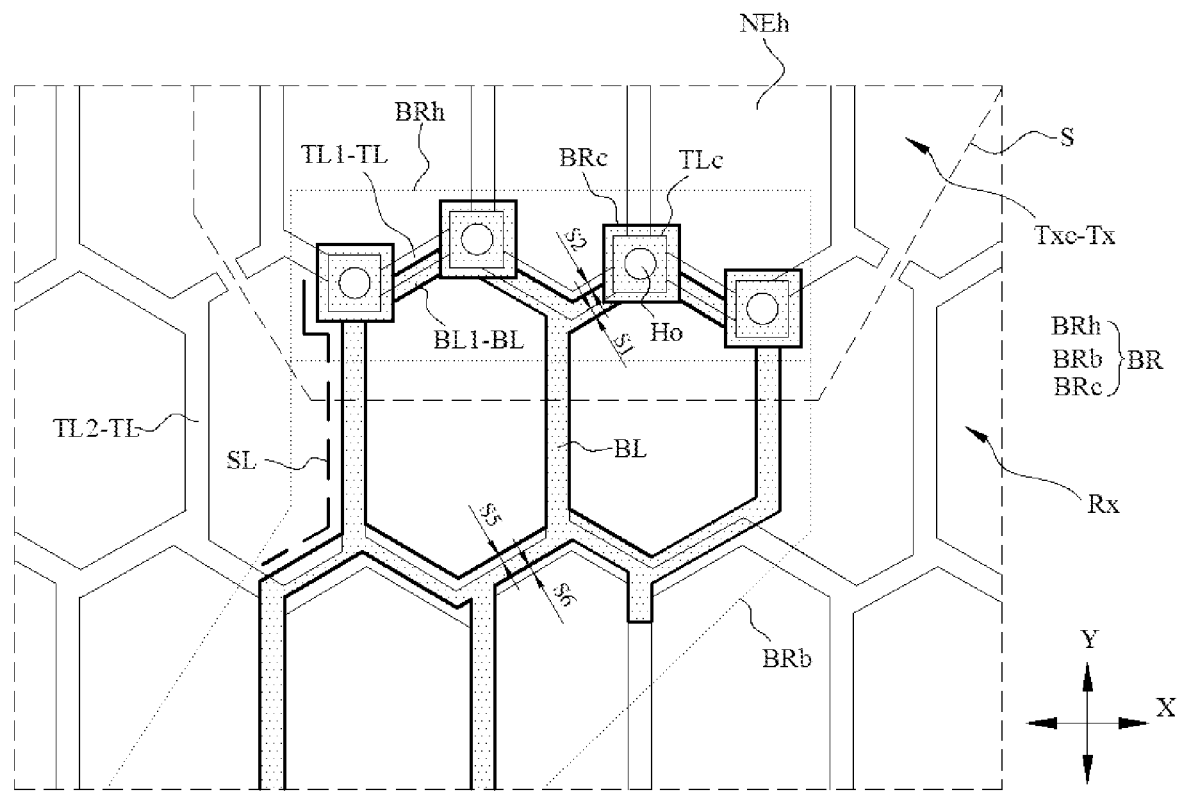
FIG. 9 is a partial schematic diagram of the touch structure according to a third embodiment of the present disclosure.
Figure 10:
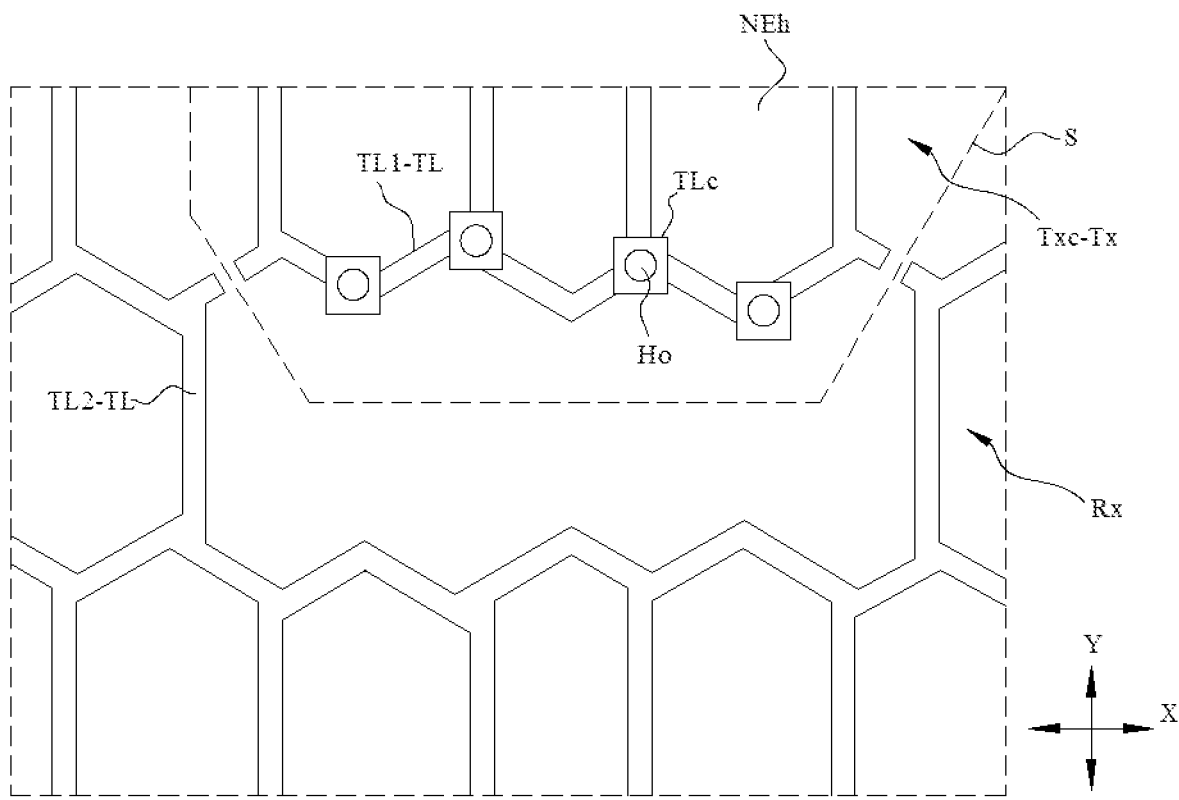
FIG. 10 is a partial schematic diagram of the electrode layer of the touch structure according to the third embodiment of the present disclosure.

As shown in FIGS. 9 and 10, in other embodiments of the present disclosure, the display substrate PNL is still an organic electroluminescent display substrate PNL, and the sub-pixels thereof may be arranged in a GGRB pattern. Specifically, the same light-emitting unit may include four sub-pixels, namely one red sub-pixel, one blue sub-pixel, and two green sub-pixels. The red sub-pixel and the blue sub-pixel may be arranged along the row direction, and shapes of the red sub-pixel and the blue sub-pixel may be both hexagon. The area of the blue sub-pixel is larger than the area of the red sub-pixel. The two green sub-pixels are arranged between the red sub-pixel and the blue sub-pixel along the column direction Y. Shapes of the two green sub-pixels are both pentagon, and areas thereof are equal. The area of the green sub-pixel is smaller than that of the red and blue sub-pixels.

Accordingly, each sub-pixel corresponds to only one mesh hole NEh, so that light can be emitted through the mesh hole NEh. The shape of any sub-pixel is the same as the shape of the corresponding mesh hole NEh. If both of them are polygons, sides of the sub-pixel and sides of the mesh hole NEh (that is, the grid lines surrounding the mesh hole NEh) are parallel in a one-to-one correspondence. The mesh hole NEh corresponding to the green sub-pixel is smaller than the mesh holes NEh corresponding to the blue sub-pixel and the red sub-pixel, and the mesh hole NEh corresponding to the blue sub-pixel is smaller than the mesh hole NEh corresponding to the red sub-pixel.

Among an opening part BRh and the first electrode block Txc connected therewith, the number of via holes Ho is multiple, such as four, five, etc., and each via hole Ho may be located on the boundary of the first electrode block Txc. At this time, each transfer line BL of the opening part BRh is a boundary transfer line BL1, and extends along the boundary of the first electrode block Txc, that is, extending along the first boundary channel line TL1.

Regarding the above touch structure, the inventor(s) has found that when forming the transfer bridge BR of the above touch structure, it may be prepared through deposition, exposure, development, etching, and other processes. During this process, the cross section of the transfer line BL is a trapezoid. That is, the side walls of the transfer line BL shrink in the direction away from the display substrate PNL. Accordingly, the insulation layer IN forms a trapezoidal protrusion at a position corresponding to the side wall of the transfer line BL, and the side wall of the protrusion also shrinks in the direction away from the substrate, as similar to the side wall of the transfer line BL. When forming the electrode layer TMB, in addition to the required pattern, there will be residual material of the electrode layer TMB outside the side wall corresponding to the protrusion, that is, outside the side wall corresponding to the transfer line BL. The residual material may extend along the side wall of the transfer line BL to connect the first electrode block Txc and the adjacent second touch electrode Rx, causing a short circuit and causing touch abnormalities such as touch failure or reduced accuracy.

In this regard, starting from the above embodiments, the inventor(s) provides a touch structure, as shown in FIGS. 5 to 11, where the boundary transfer line BL1 and the first boundary channel line TL1 are offset, the boundary transfer line BL1 limits the position of the residual material and guides the direction of the residual material, and the extension path, required for the residual material to cause the adjacent first electrode block Txc and second touch electrode to be short-circuited, is extended, thereby making it easy to be disconnected, and reducing the risk of short circuits. The extension path is shown as SL in the figures.

The following is a detailed description about the boundary transfer line BL1 and the first boundary channel line TL1.

Among the boundary transfer line BL1 and the first boundary channel line TL1 overlapping with each other, one side of the boundary transfer line BL1 is located on the side of the first boundary channel line TL1 close to the adjacent second electrode block Rxc, so that one side of the boundary transfer line BL1 moves outward, instead of aligning with the first boundary channel line TL1. At the same time, the other side of the boundary transfer line BL1 is located between both sides of the first boundary channel line TL1. Therefore, the path of the residual material, remaining outside the transfer bridge BR when forming the electrode layer TMB, may be guided through the side after moving outward of the boundary transfer line BL1, so that the path of the residual material will not directly contact the first boundary transfer line BL1 along the bridge part BRb, but instead needs to extend along the side of the boundary transfer line BL1 in a direction away from the bridge part BRb. Thus, the extension path is extended, thereby making it easy to be disconnected for avoiding a short circuit. The residual material on the outside of the boundary transfer line BL1 close to the side of the second electrode block Rxc may cause a short circuit. Even if there is residual material on the side away from the second electrode block Rxc, it is difficult to cause the first electrode block Txc and the second electrode block Rxc to be short-circuited. The boundary transfer line BL1 also has one side located between both sides of the first boundary channel line TL1. This helps to avoid having both sides of the boundary transfer line BL1 located on the outside of the first boundary channel line TL1, thereby unnecessarily increasing the width of the boundary transfer line BL1.

Figure 5:
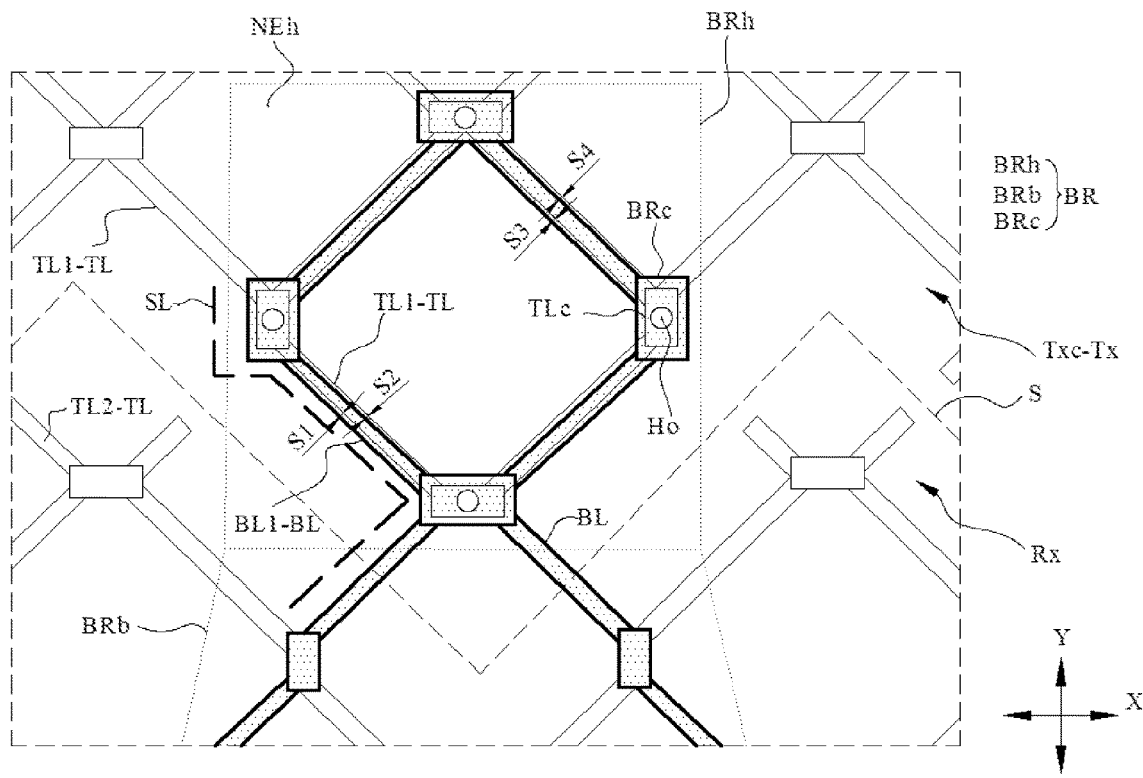
FIG. 5 is a partial schematic diagram of the touch structure according to a first embodiment of the present disclosure.

As shown in FIG. 5, in a first embodiment of the present disclosure, each transfer line BL of the opening part BRh surrounds a mesh hole NEh, and two adjacent transfer lines Bl are connected through a transfer intersection part BRc. The two transfer lines BL of the opening part BRh are the boundary transfer lines BL1, and the bridge part BRb is only connected to a transfer intersection part BRc connected with the two boundary transfer lines BL1. For example, the opening part BRh has four transfer lines BL, so that the mesh hole NEh thereof may be in a quadrilateral shape, with two boundary transfer lines BL1 and two non-boundary transfer lines BL1.

Among one transfer line Bl serving as the non-boundary transfer line BL1 of the opening part BRh and the channel line TL overlapping therewith, one side of the boundary of the transfer line BL is located at a side of the channel line TL away from the adjacent second electrode block Rxc, and the other side of the transfer line BL is located between both sides of the channel line TL. As shown in the figures, after an opening part BRh is translated as a whole, the transfer line BL and the channel line TL of the opening part BRh are arranged in a misaligned pattern.

Figure 6:
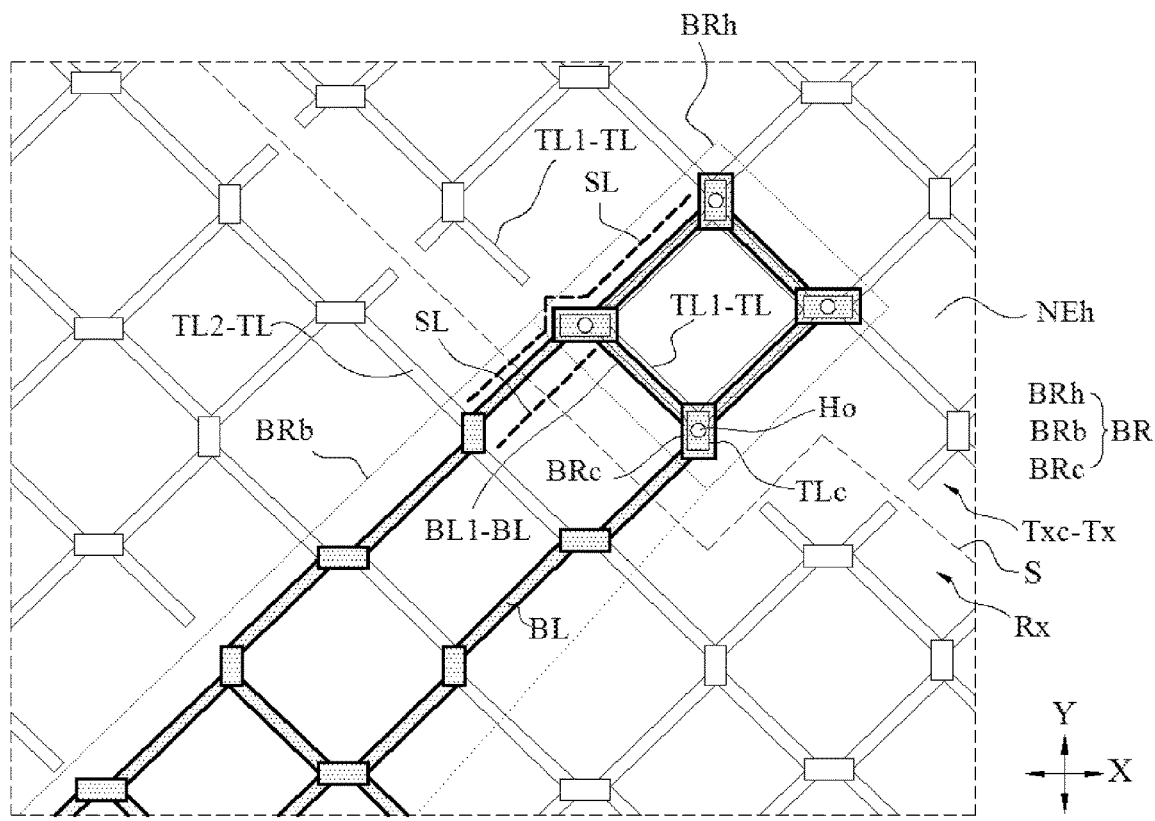
FIG. 6 is a partial schematic diagram of the touch structure according to a second embodiment of the present disclosure.
Figure 7:
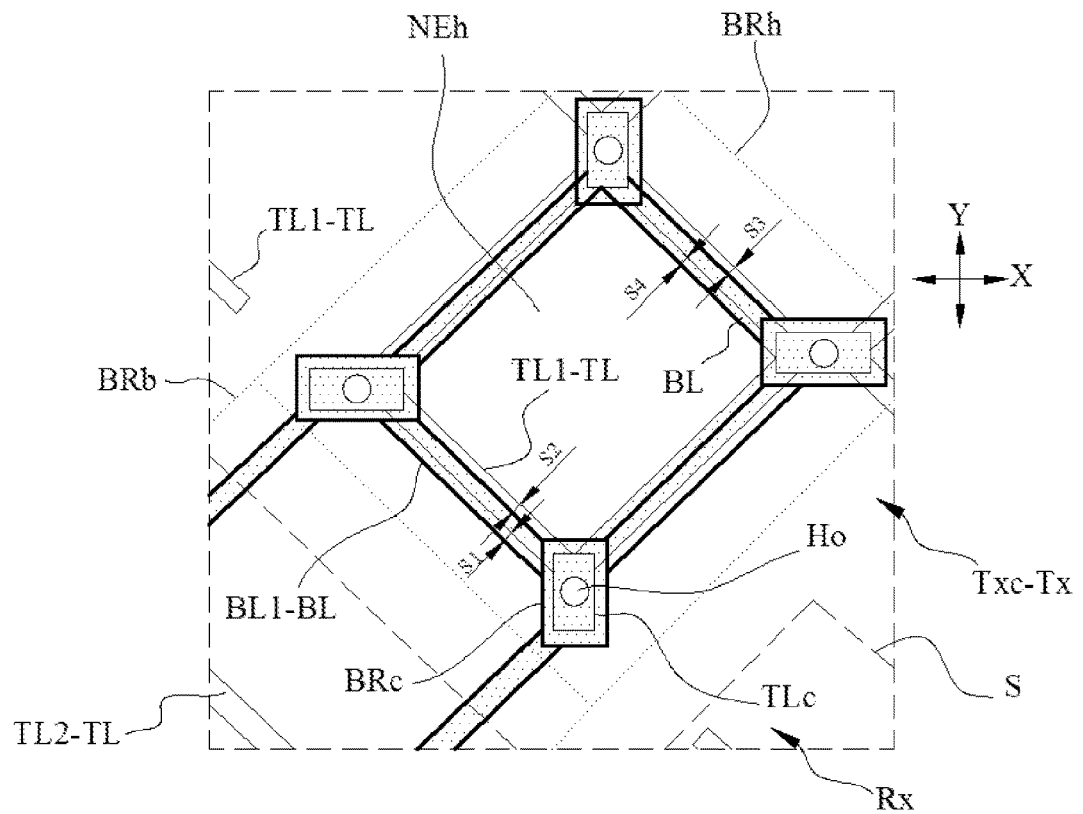
FIG. 7 is a partial enlarged view of FIG. 6.
Figure 8:
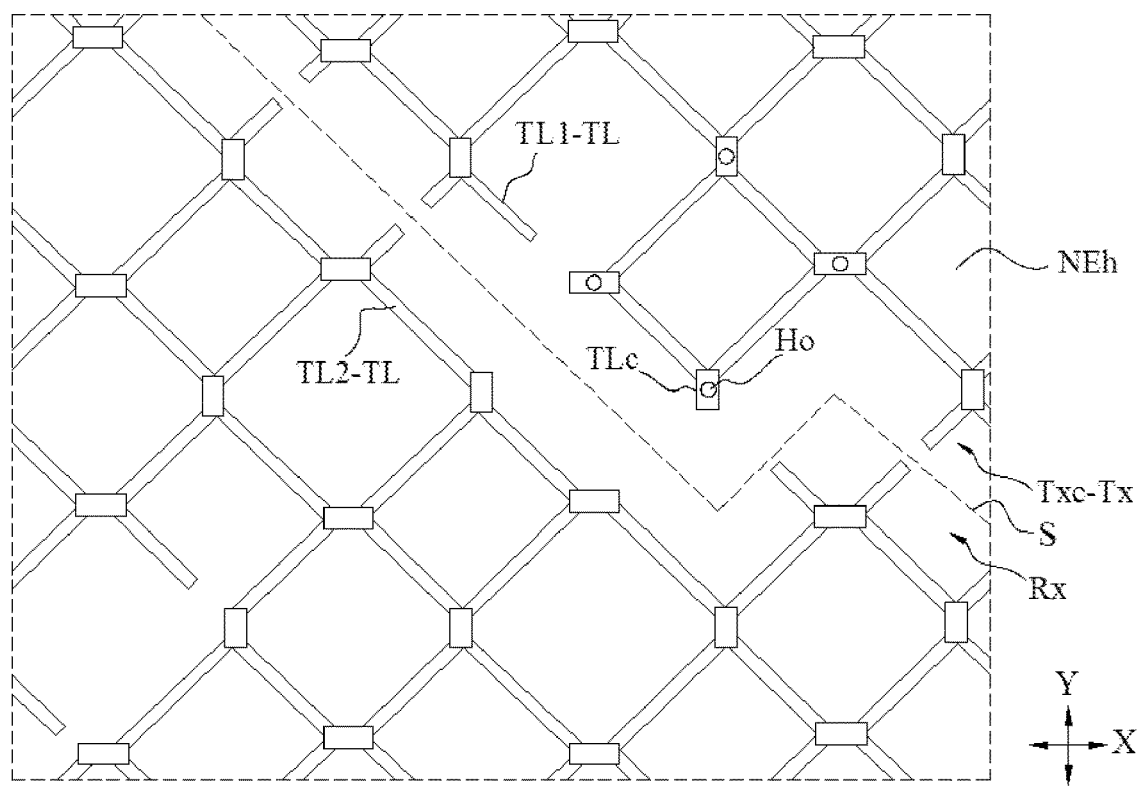
FIG. 8 is a partial schematic diagram of the electrode layer of the touch structure according to the second embodiment of the present disclosure.

As shown in FIGS. 6 to 8, with reference to the above-described embodiments, in a second embodiment of the present disclosure, the opening part BRh may have only one transfer line Bl serving as the boundary transfer line BL1, and the bridge part BRb may be connected to the transfer intersection part BRc connected with both ends of the boundary transfer line BL1. Furthermore, the opening part BRh has four transfer lines BL, so that the mesh hole NEh thereof may be in a quadrangular shape, with one boundary transfer line BL1 and three non-boundary transfer lines BL1.

Further, among an opening part BRh and the first electrode block Txc connected to each other, in the first boundary channel lines TL1 of the first electrode block Txc, the first boundary channel lines TL1 located on both sides of the opening part BRh and adjacent to the opening part BRh are all disconnected from the opening part BRh. That is to say, the channel intersection parts TLc at both ends of the first boundary channel line TL1 overlapping with the boundary transfer line BL1 are disconnected from the adjacent first boundary channel line TL1, thereby extending the extension path of the residual material of the electrode layer TMB and reducing the risk of short circuits. The extension path is shown as SL in the figures.

Figure 11:
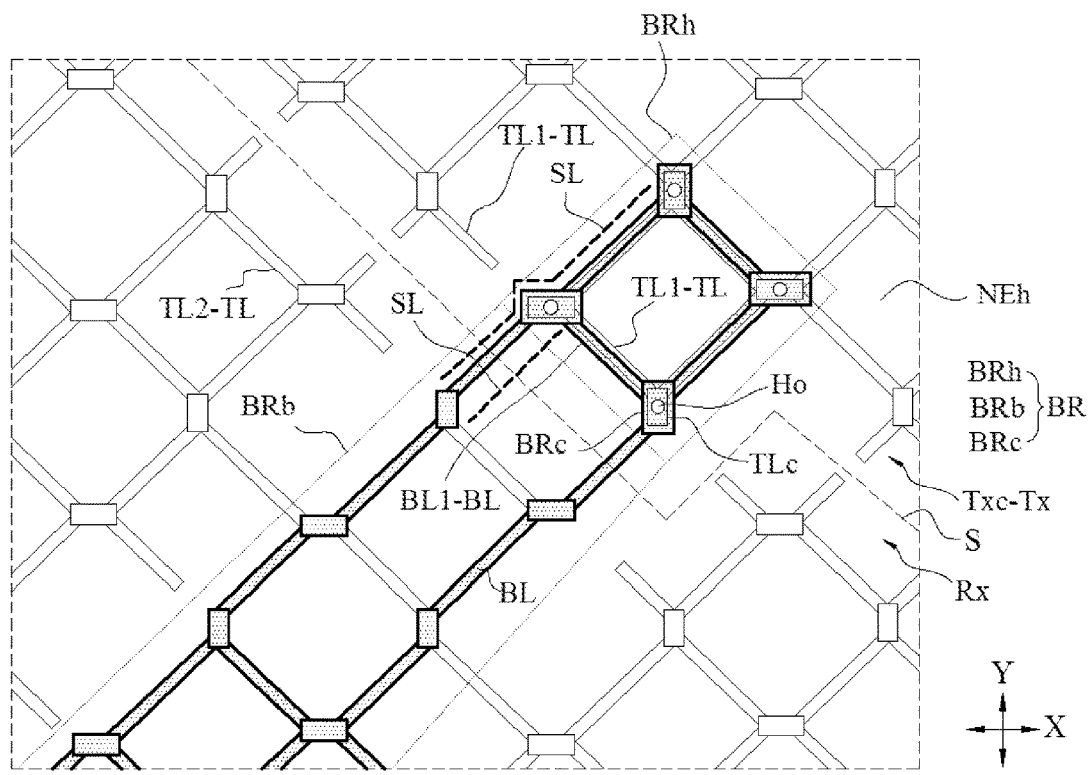
FIG. 11 is a partial schematic diagram of the touch structure according to a fourth embodiment of the present disclosure.

Furthermore, as shown in FIG. 11, the second boundary channel lines TL2 located on both sides of the opening part BRh and adjacent to the bridge part BRb may also be disconnected from the bridge part BRb, thereby further extending the path required for the residual material to cause a short circuit and reducing the risk of short circuits.

As shown in FIGS. 9 and 10, in a third embodiment of the present disclosure, among an opening part BRh and the first electrode block Txc connected to each other, each transfer line BL of the opening part BRh is a boundary transfer line BL1, and two adjacent boundary transfer lines BL1 are connected through a transfer intersection part BRc. That is to say, each transfer line BL of the opening part BRh extends along the boundary of the first electrode block Txc, without surrounding a mesh hole NEh, and overlaps with the plurality of first boundary channel lines TL1 in a one-to-one correspondence. For example, the opening part BRh has four transfer lines BL, and the four transfer lines BL are all boundary transfer lines BL1. At the same time, the opening part BRh has four transfer intersection parts BRc, and the four transfer lines BL extend along the trajectory of the first boundary channel line TL1. The four transfer intersection parts BRc are each provided with via holes Ho. Further, the mesh hole of the first electrode block Txc is in a hexagonal shape. That is, the mesh hole of the first electrode block Txc is surrounded by six channel lines TL. The four transfer intersection parts BRc extend along the extension path of the first boundary channel line TL1 in a polyline shape, and two adjacent boundary transfer lines BL1 are directly connected without being connected through the transfer intersection part BRc.

In other embodiments of the present disclosure, in a transfer bridge BR, at least one end of the bridge part BRb is connected to a plurality of opening parts BRh, and the structure of any opening part BRh may be the same as the structure of the above-mentioned opening part BRh in the first to third embodiment. For example, at least some of the opening parts BRh may be formed by a plurality of transfer lines BL surrounding a mesh hole NEh. Alternatively, the transfer lines BL of at least some of the opening parts BRh are boundary transfer lines BL1, thereby extending along the boundary of the first electrode block Txc. At the same time, the end of each transfer line BL in the opening part BRh may be provided with a via hole Ho.

Further, as shown in FIGS. 5-10, starting from the above-mentioned first to third embodiments and some other embodiments, in some embodiments of the present disclosure, the distance between the side of the boundary transfer line BL1 close to the adjacent second electrode block Rxc and the side of the first boundary channel line TL1 close to the adjacent second electrode block Rxc is the first distance S1, and the distance between the other side of the boundary transfer line BL1 and the side of the first boundary channel line TL1 away from the adjacent second electrode block Rxc is the second distance S2. The first distance S1 and the second distance S2 may be made equal, that is, S1=S2, so that the above-mentioned first distance S1 and second distance S2 can be obtained by translating the boundary transfer line BL1 with the same width as other transfer lines BL. That is to say, the boundary transfer line BL1 between both sides of the first boundary channel line TL1 may be translated outward, which is beneficial to ensuring the uniformity of the width of each transfer line BL1 and reducing the process difficulty. Either of the first distance S1 and the second distance S2 may be 1 μm-1.5 μm, such as 1 μm, 1.2 μm, 1.3 μm, or 1.5 μm.

Further, as shown in FIGS. 5 to 8, starting from the above-mentioned first and second embodiments and the implementations of other opening parts BRh having a transfer line BL serving as a non-boundary transfer line BL1, in some embodiments of the present disclosure, among the transfer line BL serving as one non-boundary transfer line BL1 of the opening part BRh and the channel line TL overlapping therewith, the distance between one side of the boundary of the transfer line BL and the side of the channel line TL away from the adjacent second electrode block Rxc is the third distance S3, and the distance between the other side of the transfer line T1 and the side of the channel line TL close to the adjacent second electrode block Rxc is the fourth distance S4. The third distance S3 and the fourth distance S4 may be made equal, that is, S3=S4. Either one of the third distance S3 and the fourth distance S4 may be 1 μm-1.5 μm, such as 1 μm, 1.2 μm, 1.3 μm, or 1.5 μm, Therefore, the transfer lines BL serving as the non-boundary transfer lines BL1 of each opening part BRh may be offset from the channel line TL in the same way. It is noted that the first distance S1, the second distance S2, the third distance S3, and the fourth distance S4 may be equal, so that the above-mentioned first distance S1, second distance S2, third distance S3, and fourth distance S4 can be obtained by translating the transfer line BL without changing its width.

In order to further extend the extension path of the residual material of the electrode layer TMB, among the transfer intersection part BRc and the channel intersection part TLc overlapping with each other, the boundary of the transfer intersection part BRc may be located inside the boundary of the channel intersection part TLc. That is to say, the boundary of the orthographic projection of the transfer intersection part BRc on the display substrate PNL is located inside the boundary of the orthographic projection of the channel intersection part TLc on the display substrate PNL, and the distance between the two boundaries may be 1 μm-1.5 μm, for example, 1 μm, 1.2 μm, 1.3 μm, or 1.5 μm. The distance may be equal to the above-mentioned first to fourth distances S4.

Starting from any of the above embodiments, as shown in FIGS. 9 and 10, in some embodiments of the present disclosure, the channel line forming the boundary of the second electrode block Rxc may be defined as the second boundary channel line TL2.

Among a second touch electrode Rx and the bridge part BRb intersecting therewith, the second boundary channel lines TL2 located on both sides of the bridge part BRb and adjacent to the bridge part BRb are disconnected from the bridge part BRb, so that the extension path of the residual material of the electrode layer TMB is increased and the path that may cause a short circuit is increased, thereby reducing the risk of short circuits. The extension path is shown as SL in the figures.

In addition, some of the transfer lines of the bridge part BRb overlap with the second boundary channel line TL2 in a one-to-one correspondence. Among a transfer line BL and a second boundary channel line TL2 overlapping with each other, one side of the transfer line BL is located on the side of the second boundary channel line TL2 close to the adjacent first electrode block Txc, and the other side of the transfer line BL is located between both sides of the second boundary channel line TL2. That is to say, the concept of misaligning the first boundary channel line TL1 and the boundary transfer line BL1 may be used to render the second boundary channel line TL2 and the transfer line BL overlapping therewith to be misaligned, and one boundary of the transfer line BL is located at the outer side of the second touch electrode Rx, thereby preventing the residual material from contacting the second touch electrode Rx and causing a short circuit.

Among a transfer line BL and a second boundary channel line TL1 overlapping with each other, the distance between one side of the boundary of the transfer line BL and the side of the second boundary channel line TL2 away from the second touch electrode Rx is the fifth distance S5, and the distance between the other side of the transfer line BL and the side of the second boundary channel line TL2 close to the adjacent second touch electrode Rx is the sixth distance S6. The fifth distance S5 and the sixth distance S6 are equal, that is, S5=S6. Both the fifth distance S5 and the sixth distance S6 may be 1 μm-1.5 μm, such as 1 μm, 1.2 μm, 1.3 μm, or 1.5 μm.

An embodiment of the present disclosure also provides a touch display panel, as shown in FIG. 2, which may include a display substrate PNL and a touch structure.

The display substrate PNL may be an organic electroluminescent display substrate PNL, a liquid crystal display substrate, etc., and its structure is not particularly limited here.

Taking the organic electroluminescent display substrate PNL as an example, it may include a driving backplane BP, a light-emitting device layer OL, and an encapsulation layer TFE.

The driving backplane BP has a driving circuit, which may be used to drive each light-emitting device of the light-emitting device layer OL to emit light independently for displaying an image. Meanwhile, the driving backplane BP may include a pixel area and a peripheral area located outside the pixel area. For example, the peripheral area may be a continuous or discontinuous annular area surrounding the pixel area.

The driving circuit may include a pixel circuit and a peripheral circuit. At least part of the pixel circuit is located in the pixel area. It is noted that part of the pixel circuit may be located in the peripheral area. The pixel circuit may be a 7T1C, 7T2C, 6T1C, or 6T2C structure, as long as it can drive the light-emitting device to emit light, and its structure is not specifically limited here. The number of pixel circuits is the same as the number of light-emitting devices, and they are connected to each light-emitting device in a one-to-one correspondence, so as to control each light-emitting device to emit light independently. nTmC means that a pixel circuit includes n transistors (indicated by the letter "T") and m capacitors (indicated by the letter "C").

The peripheral circuit is located in the peripheral area and is connected to the pixel circuit, for inputting driving signals to the pixel circuit to control the light-emitting device to emit light. The peripheral circuit may include a gate driving circuit, a source driving circuit, a light-emitting control circuit, etc., and also other circuits. The specific structure of the peripheral circuit is not specifically limited here.

The driving backplane BP may be formed of multiple film layers. For example, the driving backplane BP may include a substrate and a driving layer provided on one side of the substrate. The substrate may be a single-layer or multi-layer structure, and may be a hard or flexible structure, which is not specifically limited here. The above-mentioned driving circuit may be located on the driving layer. Taking the transistor in the driving circuit as a top-gate thin film transistor as an example, the driving layer may include an active layer, a first gate insulation layer, a gate, a second gate insulation layer, an interlayer dielectric layer, a first source and drain layer, a passivation layer, a first planarization layer, a second source and drain layer, and a second planarization layer.

The active layer is disposed on the substrate. The first gate insulation layer covers the active layer. The gate is disposed on the surface of the first gate insulation layer away from the substrate, and is disposed facing the active layer. The second gate insulation layer covers the gate electrode and the first gate insulation layer. The interlayer dielectric layer covers the second gate insulation layer. The first source and drain layer is provided on the surface of the interlayer dielectric layer away from the substrate, and includes a source and a drain. The source and the drain are connected to the active layer. The passivation layer covers the first source and drain layer. The first planarization layer covers the passivation layer. The second source and drain layer is provided on the surface of the first planarization layer away from the substrate, and is connected to the first source and drain layer. The second planarization layer covers the second source and drain layer and the first planarization layer.

The light-emitting device layer OL is provided on one side of the driving backplane BP. For example, the light-emitting device layer OL is provided on the surface of the driving layer away from the substrate. The light-emitting device layer OL may include a plurality of light-emitting devices arranged in an array in the pixel area and a pixel definition layer defining each light-emitting device.

The pixel definition layer may be provided on one side of the driving backplane BP. For example, the pixel definition layer may be provided on the surface of the second planarization layer away from the substrate. The pixel definition layer is used to separate individual light-emitting devices. Specifically, the pixel definition layer may be provided with multiple openings, and the range defined by each opening is the range for a light-emitting device. The shape of the opening, that is, the shape of the outline of the orthographic projection of the opening on the driving back plate BP, may be a polygon, a smooth closed curve, or other shapes. The smooth closed curve may be a circle, an ellipse, or an waisted circle, etc. Here, No special restrictions are made.

A pixel circuit may be connected to at least one light-emitting device to emit light under the driving by the driving circuit. For example, the light-emitting device may be connected to the second source and drain layer, and can emit light under the driving by the driving circuit. The light-emitting device may be an organic light-emitting diode, which may include a first electrode, a light-emitting functional layer, and a second electrode sequentially stacked in a direction away from the driving backplane BP.

The first electrode and the pixel definition layer may be disposed on the same surface of the driving backplane BP, serving as an anode of the light-emitting device. Each opening of the pixel definition layer exposes each first electrode in a one-to-one correspondence. The first electrode may be a single-layer or multi-layer structure, and its material may include one or more of conductive metals, metal oxides, and alloys.

The light-emitting functional layer is at least partially disposed in the opening, and may include a hole injection layer, a hole transport layer, a light-emitting material layer, an electron transport layer, and an electron injection layer sequentially stacked in a direction away from the driving backplane BP. Electrons and holes are combined into excitons in the light-emitting material layer, and the excitons radiate photons, thereby generating visible light. The specific light-emitting principle will not be described in detail here.

The second electrode may cover the light-emitting functional layer, serving as the cathode of the light-emitting device. The second electrode may be a single-layer or multi-layer structure, and its material may include one or more of conductive metals, metal oxides, and alloys.

Furthermore, each light-emitting device may share the same second electrode. Specifically, the second electrode is a continuous conductive layer covering the light-emitting functional layer of each light-emitting device and the pixel definition layer. That is to say, the orthographic projection of the second electrode on the pixel definition layer covers each opening.

The encapsulation layer TFE covers the light-emitting device layer OL, and may be used to protect the light-emitting device layer OL and prevent external water and oxygen from corroding the light-emitting device. For example, the encapsulation layer TFE may be encapsulated by thin film encapsulation, and may include a first inorganic layer, an organic layer, and a second inorganic layer. The first inorganic layer covers the surface of the light-emitting device layer OL away from the driving backplane BP. For example, the first inorganic layer may cover the second electrode. The organic layer may be disposed on the surface of the first inorganic layer away from the driving backplane BP, and the boundary of the organic layer is limited to be inside the boundary of the first inorganic layer. The boundary of the orthographic projection of the organic layer on the driving backplane BP may be located in the peripheral area, ensuring that the organic layer can cover each light-emitting device. The second inorganic layer may cover the organic layer and the first inorganic layer that is not covered by the organic layer, and helps to block the intrusion of water and oxygen through the second inorganic layer, and achieve planarization through the flexible organic layer.

The touch structure may be disposed on the side of the encapsulation layer TFE away from the driving backplane BP. For example, the buffer layer BA may be disposed on the surface of the encapsulation layer TFE away from the driving backplane BP. The orthographic projection of the touch structure on the driving backplane BP at least covers the pixel area. For the specific structure of the touch structure, reference may be made to the above embodiments of the touch structure, which will not be described again here. The mesh hole NEh of the electrode layer TMB in the touch structure may be arranged in a one-to-one correspondence with each light-emitting device. For specific implementations, please refer to the implementations of the touch structure above.

In addition, in some embodiments of the present disclosure, the touch display panel may also include a polarization layer and a transparent cover. The polarization layer is a circular polarizer that reduces reflection of external light. The specific principle thereof will not be described in detail. The transparent cover may be bonded to the polarization layer and may be flattened. The transparent cover is used to protect the film layers below, and its material may be transparent materials such as glass or acrylic, which is not specifically limited here.

Embodiments of the present disclosure also provide a display device, which may include the touch display panel according to any of the above embodiments. For the specific structures and beneficial effects of the touch display panel, please refer to the above embodiments of the touch structure and the touch display panel, and will not be described in detail here. The display device of the present disclosure may be an electronic device with a touch display function such as a mobile phone or a tablet computer, which will not be listed here.

Other embodiments of the present disclosure will be readily apparent to those skilled in the art from consideration of the specification and practice of the contents disclosed herein. The present application is intended to cover any variations, uses, or adaptations of the present disclosure that follow the general principles of the present disclosure and include common knowledge or customary technical means in the technical field that are not disclosed in the present disclosure. It is intended that the specification and examples be considered as exemplary only, with the true scope and spirit of the present disclosure being indicated by the following claims.

The invention claimed is:

1. A touch structure, provided on a side of a display substrate, and comprising: a plurality of first touch electrodes and a plurality of second touch electrodes, wherein
the first touch electrodes are arranged at intervals along a row direction, and one of the first touch electrodes comprises a plurality of first electrode blocks arranged at intervals along a column direction and transfer bridges connecting two adjacent ones of the first electrode blocks;
the second touch electrodes are arranged at intervals along the column direction, and one of the second touch electrodes comprises a plurality of second electrode blocks connected in series along the row direction;
one of the transfer bridges is intersected with one of the second touch electrodes, the first electrode block and the second electrode block are located on a same electrode layer and arranged at intervals, the transfer bridge is located on a side of the electrode layer, and an insulation layer is provided between the transfer bridge and the electrode layer;
the first touch electrode and the second touch electrode are mesh structures formed by a plurality of grid lines, grid lines of the first electrode block and the second electrode block are channel lines, the channel lines forming boundaries of the first electrode block are first boundary channel line, and grid lines of the transfer bridge are transfer lines;
the transfer bridge comprises at least two opening parts and a bridge part connecting the opening parts, the opening part and the first electrode block are connected through a via hole penetrating the insulation layer, and the bridge part is intersected with the second touch electrode;
some of the transfer lines of the opening part are boundary transfer lines, and the boundary transfer lines overlap with some of the first boundary channel lines;
the transfer line and the channel line overlapping with each other extend in a same direction; and
among the boundary transfer line and the first boundary channel line overlapping with each other, one side of the boundary transfer line is located on a side of the first boundary channel line close to the adjacent second electrode block, and the other side of the boundary transfer line is located between both sides of the first boundary channel line.

2. The touch structure according to claim 1, wherein
at least some adjacent transfer lines in the opening part are connected through a transfer intersection part, and at least some of the transfer intersection parts are connected to the boundary transfer line;
at least some adjacent channel lines in the first electrode block are connected through a channel intersection part, and at least some of the channel intersection parts are connected to the boundary channel line;
the transfer intersection parts and the channel intersection parts overlap with each other in a one-to-one correspondence, and the transfer intersection part and the channel intersection part overlapping with each other are connected through the via holes; and
among the transfer intersection part and the channel intersection part overlapping with each other, a boundary of the transfer intersection part is located inside a boundary of the channel intersection part.

3. The touch structure according to claim 2, wherein
the mesh structure has mesh holes surrounded by the grid lines;
the transfer lines of the opening part surround a mesh hole, and two adjacent transfer lines are connected by a transfer intersection part; and
two transfer lines of the opening part are the boundary transfer lines, and the bridge part is only connected to the transfer intersection part connecting two boundary transfer lines.

4. The touch structure according to claim 3, wherein the opening part has four transfer lines and four transfer intersection parts, mesh holes surrounded by the four transfer lines and the four transfer intersection parts are in quadrangular shapes, and the four transfer intersection parts are provided with the via holes.

5. The touch structure according to claim 3, wherein
among the boundary transfer line and the first boundary channel line overlapping with each other, a distance between one side of the boundary transfer line close to an adjacent second electrode block and a side of the first boundary channel line close to an adjacent second electrode block is a first distance, and a distance between the other side of the boundary transfer line and a side of the first boundary channel line away from an adjacent second electrode block is a second distance; and
the first distance is equal to the second distance.

6. The touch structure according to claim 5, wherein
among the transfer line not serving as the boundary transfer line in the opening part and the channel line overlapping with the transfer line, one side of a boundary of the transfer line is located on a side of the channel line away from an adjacent second electrode block, and the other side of the transfer line is located between both sides of the channel line.

7. The touch structure according to claim 6, wherein
among the transfer line not serving as the boundary transfer line in the opening part and the channel line overlapping with the transfer line, a distance between one side of the boundary of the transfer line and a side of the channel line away from the second electrode block is a third distance, and a distance between the other side of the transfer line and a side of the channel line close to an adjacent second electrode block is a fourth distance; and
the third distance is equal to the fourth distance.

8. The touch structure according to claim 7, wherein the first distance, the second distance, the third distance, and the fourth distance are equal.

9. The touch structure according to claim 7, wherein at least one of the first distance and the third distance is 1.2 μm.

10. The touch structure according to claim 2, wherein
the mesh structure has mesh holes surrounded by the grid lines; and
the transfer lines of the opening part surround a mesh hole, and two adjacent transfer lines are connected through a transfer intersection part;
there is only one transfer line serving as the boundary transfer line in the opening part; and
the bridge part is connected to the transfer intersection part connected with both ends of the boundary transfer line.

11. The touch structure according to claim 10, wherein, among the opening part and the first electrode block connected with each other,
in the first boundary channel lines of the first electrode block, the first boundary channel lines located on both sides of the opening part and adjacent to the opening part are disconnected from the opening part.

12. The touch structure according to claim 10, wherein the opening part has four transfer lines and four transfer intersection parts, mesh holes surrounded by the four transfer lines and the four transfer intersection parts are in quadrangular shapes, and the four transfer intersection parts are provided with the via holes.

13. The touch structure according to claim 10, wherein
among the boundary transfer line and the first boundary channel line overlapping with each other, a distance between one side of the boundary transfer line close to an adjacent second electrode block and a side of the first boundary channel line close to an adjacent second electrode block is a first distance, and a distance between the other side of the boundary transfer line and a side of the first boundary channel line away from an adjacent second electrode block is a second distance; and
the first distance is equal to the second distance.

14. The touch structure according to claim 2, wherein
among the opening part and the first electrode block connected with each other, the transfer lines of the opening part are the boundary transfer lines, and at least two adjacent boundary transfer lines are connected through a transfer intersection part.

15. The touch structure according to claim 14, wherein the opening part has four transfer lines and four transfer intersection parts, the four transfer lines extend along a trajectory of the first boundary channel line, and the four transfer intersection parts are provided with the via holes.

16. The touch structure according to claim 1, wherein
the channel line forming a boundary of the second electrode block is a second boundary channel line; and
among the second touch electrode and the bridge part intersecting with the second touch electrode, the second boundary channel lines located on both sides of the bridge part and adjacent to the bridge part are disconnected from the bridge part.

17. The touch structure according to claim 16, wherein some transfer lines of the bridge part overlap with the second boundary channel lines in a one-to-one correspondence; and
among the transfer line and the second boundary channel line overlapping with each other, one side of the transfer line is located on a side of the second boundary channel line close to an adjacent first electrode block, and the other side of the transfer line is located between both sides of the second boundary channel line.

18. The touch structure according to claim 17, wherein
among the transfer line and the second boundary channel line overlapping with each other, a distance between one side of a boundary of the transfer line and a side of the second boundary channel line close to the first electrode block is a fifth distance, and a distance between the other side of the transfer line and a side of the second boundary channel line away from an adjacent first electrode block is a sixth distance; and
the fifth distance is equal to the sixth distance.

19. A touch display panel, comprising:
a display substrate; and
a touch structure, provided on a side of a display substrate, and comprising: a plurality of first touch electrodes and a plurality of second touch electrodes, wherein
the first touch electrodes are arranged at intervals along a row direction, and one of the first touch electrodes comprises a plurality of first electrode blocks arranged at intervals along a column direction and transfer bridges connecting two adjacent ones of the first electrode blocks;
the second touch electrodes are arranged at intervals along the column direction, and one of the second touch electrodes comprises a plurality of second electrode blocks connected in series along the row direction;
one of the transfer bridges is intersected with one of the second touch electrodes, the first electrode block and the second electrode block are located on a same electrode layer and arranged at intervals, the transfer bridge is located on a side of the electrode layer, and an insulation layer is provided between the transfer bridge and the electrode layer;
the first touch electrode and the second touch electrode are mesh structures formed by a plurality of grid lines, grid lines of the first electrode block and the second electrode block are channel lines, the channel lines forming boundaries of the first electrode block are first boundary channel line, and grid lines of the transfer bridge are transfer lines;
the transfer bridge comprises at least two opening parts and a bridge part connecting the opening parts, the opening part and the first electrode block are connected through a via hole penetrating the insulation layer, and the bridge part is intersected with the second touch electrode;
some of the transfer lines of the opening part are boundary transfer lines, and the boundary transfer lines overlap with some of the first boundary channel lines;
the transfer line and the channel line overlapping with each other extend in a same direction;
among the boundary transfer line and the first boundary channel line overlapping with each other, one side of the boundary transfer line is located on a side of the first boundary channel line close to the adjacent second electrode block, and the other side of the boundary transfer line is located between both sides of the first boundary channel line; and
the transfer bridges are provided on a side of the display substrate, the insulation layer covers the transfer bridges, and the electrode layer is provided on a side of the insulation layer away from the display substrate.

20. A display device, comprising a touch display panel, comprising:

a display substrate; and
  a touch structure, provided on a side of a display substrate, and comprising: a plurality of first touch electrodes and a plurality of second touch electrodes, wherein the first touch electrodes are arranged at intervals along a row direction, and one of the first touch electrodes comprises a plurality of first electrode blocks arranged at intervals along a column direction and transfer bridges connecting two adjacent ones of the first electrode blocks;

the second touch electrodes are arranged at intervals along the column direction, and one of the second touch electrodes comprises a plurality of second electrode blocks connected in series along the row direction;

one of the transfer bridges is intersected with one of the second touch electrodes, the first electrode block and the second electrode block are located on a same electrode layer and arranged at intervals, the transfer bridge is located on a side of the electrode layer, and an insulation layer is provided between the transfer bridge and the electrode layer;

the first touch electrode and the second touch electrode are mesh structures formed by a plurality of grid lines, grid lines of the first electrode block and the second electrode block are channel lines, the channel lines forming boundaries of the first electrode block are first boundary channel line, and grid lines of the transfer bridge are transfer lines;

the transfer bridge comprises at least two opening parts and a bridge part connecting the opening parts, the opening part and the first electrode block are connected through a via hole penetrating the insulation layer, and the bridge part is intersected with the second touch electrode;

some of the transfer lines of the opening part are boundary transfer lines, and the boundary transfer lines overlap with some of the first boundary channel lines;

the transfer line and the channel line overlapping with each other extend in a same direction;

among the boundary transfer line and the first boundary channel line overlapping with each other, one side of the boundary transfer line is located on a side of the first boundary channel line close to the adjacent second electrode block, and the other side of the boundary transfer line is located between both sides of the first boundary channel line; and the transfer bridges are provided on a side of the display substrate, the insulation layer covers the transfer bridges, and the electrode layer is provided on a side of the insulation layer away from the display substrate.

* * * * *